US011464159B2

(12) United States Patent
Missotten et al.

(10) Patent No.: US 11,464,159 B2
(45) Date of Patent: *Oct. 11, 2022

(54) CONTROLLER FOR A HARVESTER

(71) Applicant: CNH Industrial America LLC, New Holland, PA (US)

(72) Inventors: Bart M. A. Missotten, Herent (BE); Glenn Aesaert, Izegem (BE); Michael Carpentier, Varsenare (BE); Dré W. J. Jongmans, Klundert (NL); Thomas Mahieu, Vleteren (BE); Ricardo Mesquita, Oudenburg (BE); Karel M. C. Viaene, Moorslede (BE); Bart Vroman, Aalter (BE); Johnny M. F. Scherrens, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 279 days.

This patent is subject to a terminal disclaimer.

(21) Appl. No.: 16/791,477

(22) Filed: Feb. 14, 2020

(65) Prior Publication Data

US 2020/0178460 A1 Jun. 11, 2020

Related U.S. Application Data

(63) Continuation of application No. 15/835,682, filed on Dec. 8, 2017, now Pat. No. 10,575,461, which is a (Continued)

(30) Foreign Application Priority Data

May 29, 2015 (BE) .................................. 2015/0149

(51) Int. Cl.
*A01D 34/00* (2006.01)
*A01D 41/00* (2006.01)
(Continued)

(52) U.S. Cl.
CPC ......... *A01D 34/006* (2013.01); *A01D 41/127* (2013.01); *B60K 35/00* (2013.01); *A01D 2101/00* (2013.01)

(58) Field of Classification Search
CPC ................ A01D 34/006; A01D 41/127; A01D 2101/00; A01D 75/00; A01D 34/00; A01D 41/00; B60K 35/00
See application file for complete search history.

(56) References Cited

U.S. PATENT DOCUMENTS 5,995,895 A * 11/1999 Watt .................... B60K 31/0066
56/10.2 G
6,009,186 A 12/1999 Gorretta et al.
(Continued)

FOREIGN PATENT DOCUMENTS

DE 10147733 A1 4/2003
DE 102009009817 A1 8/2010
(Continued)

OTHER PUBLICATIONS

Claas KGaA mbH; "Betriebsanleitung: CEMOS" (CEBIS Mobile Instruction Manual), in German; Jul. 2012 (38 pages).

*Primary Examiner* — Yonel Beaulieu
(74) *Attorney, Agent, or Firm* — Peter Zacharias; Patrick Sheldrake

(57) ABSTRACT

A controller for a harvester. The controller is configured to receive crop flow information representative of how crop is flowing through the harvester and generate display information for providing a visual display to an operator of the harvester. The visual display includes an animation of crop flowing through the harvester. The controller is further configured to set one or more properties of the animation of the crop flowing through the harvester based on the received crop flow information.

20 Claims, 6 Drawing Sheets

Related U.S. Application Data continuation of application No. 15/166,995, filed on May 27, 2016, now Pat. No. 9,877,427.

(51) Int. Cl.
  *B60K 35/00* (2006.01)
  *A01D 41/127* (2006.01)
  *A01D 101/00* (2006.01)

(56) References Cited

U.S. PATENT DOCUMENTS

| | | | |
|---|---|---|---|
| 6,097,425 A | 8/2000 | Behnke et al. | |
| 6,119,442 A | 9/2000 | Hale | |
| 6,863,604 B2 | 3/2005 | Behnke | |
| 7,877,969 B2 | 2/2011 | Behnke | |
| 7,976,369 B2 | 7/2011 | Craessaerts | |
| 8,333,640 B2 | 12/2012 | Bussmann | |
| 8,340,862 B2 | 12/2012 | Baumgarten et al. | |
| 8,635,840 B2 | 1/2014 | Behnke | |
| 8,930,039 B2 | 1/2015 | Murray et al. | |
| 9,345,194 B2 | 5/2016 | Schroeder et al. | |
| 9,462,752 B2 * | 10/2016 | Farley | A01F 12/44 |
| 9,600,872 B2 | 3/2017 | Dima | |
| 9,772,625 B2 * | 9/2017 | Gilmore | G06Q 10/06 |
| 9,818,308 B2 | 11/2017 | Neu et al. | |
| 9,877,427 B2 | 1/2018 | Missotten et al. | |
| 9,983,142 B2 * | 5/2018 | Acheson | G01N 33/0098 |
| 10,255,670 B1 * | 4/2019 | Wu | H04N 7/183 |
| 10,318,138 B2 * | 6/2019 | Schler | A01D 41/1273 |
| 10,515,425 B2 * | 12/2019 | Koch | A01D 41/127 |
| 10,531,603 B2 * | 1/2020 | Ferrari | A01B 69/001 |
| 10,670,708 B2 * | 6/2020 | Kemmer | G01S 19/14 |
| 11,079,725 B2 * | 8/2021 | Palla | G05B 13/041 |
| 11,178,818 B2 * | 11/2021 | Brammeier | A01D 41/1275 |
| 2003/0172636 A1 | 9/2003 | Clauss | |
| 2009/0044505 A1 | 2/2009 | Huster et al. | |
| 2011/0072773 A1 * | 3/2011 | Schroeder | A01D 41/127 348/148 |
| 2012/0004813 A1 | 1/2012 | Baumgarten et al. | |
| 2014/0019017 A1 | 1/2014 | Wilken et al. | |
| 2014/0053094 A1 | 2/2014 | Grevinga et al. | |
| 2015/0009328 A1 | 1/2015 | Escher et al. | |
| 2016/0078611 A1 * | 3/2016 | Butts | A01D 57/12 382/110 |
| 2016/0345491 A1 | 12/2016 | Missotten et al. | |
| 2021/0206459 A1 * | 7/2021 | Johnson | G01C 21/3647 |

FOREIGN PATENT DOCUMENTS

| | | |
|---|---|---|
| DE | 102010015902 A1 | 9/2011 |
| DE | 102013107766 A1 | 1/2015 |
| EP | 2022312 B1 | 3/2011 |
| EP | 1297733 B2 | 8/2011 |

* cited by examiner

CONTROLLER FOR A HARVESTER

CROSS REFERENCE TO RELATED APPLICATION

This application is a continuation of U.S. patent application Ser. No. 15/835,682, filed Dec. 8, 2017 (now U.S. Pat. No. 10,575,461, issued on Mar. 3, 2020), which is a continuation of U.S. patent application Ser. No. 15/166,995, filed May 27, 2016 (now U.S. Pat. No. 9,877,427 issued on Jan. 30, 2018), which, in turn, claims priority to Belgium Application No. 2015/0149, filed May 29, 2015, the contents of all of which are hereby incorporated herein by reference in their entirety for all purposes.

FIELD OF THE INVENTION

The present disclosure relates to controllers for harvesters, such as combine/forage harvesters, and methods of controlling such harvesters.

BACKGROUND OF THE INVENTION

Harvesters, such as combine harvesters, are becoming increasingly complicated. As additional sensors are added to combine harvesters, it can be increasingly difficult for an operator to control the harvester in an optimal way.

SUMMARY OF THE INVENTION

According to a first aspect, there is provided a controller for a harvester configured to receive crop flow information representative of how crop is flowing through the harvester; generate display information for providing a visual display to an operator of the harvester, wherein the visual display comprises an animation of crop flowing through the harvester; and set one or more properties of the animated crop flow based on the received crop flow information.

Generating display information for an animation of crop flow in this way can improve user operability of the harvester. Amongst other things, this can advantageously result in reduced crop losses during operation of the harvester.

The controller may further be configured to receive a machine setting value for the harvester. The animation may comprise moving parts of the harvester. The controller may be configured to set one or more properties of the moving parts of the harvester and/or animated crop flow based on the received machine setting value.

The controller may be further configured to receive machine-status-information representative of the status of the harvester. Optionally, the animation may comprise moving parts of the harvester. The controller may be configured to set one or more properties of the moving parts of the harvester and/or animated crop flow based on the received machine setting value.

The controller may be configured to set a speed of rotation and/or a speed of motion of the moving parts of the harvester in the animation based on the received machine setting values.

The received crop flow information may comprise material-flow-rate-information that is representative of a flow rate of material at a specific point in a crop flow path through the harvester. The visual display may comprise a region of material being associated with the specific point in the harvester. The controller may be configured to set a flow-rate-property of the region of material based on the speed-of-material-information.

The received crop flow information may comprise amount-of-material-information that is representative of an amount of material at a specific point in a crop flow path through the harvester. The visual display may comprise a region of material being associated with the specific point in the harvester. The controller may be configured to set a size of the region of material based on the amount-of-material-information.

The received crop flow information may comprise material-type-information (for example grain, MOG or broken grain) that is representative of a type of material that is flowing through the harvester. The controller may be configured to set a visual property of the crop flowing through the harvester based on the material-type-information.

The received crop flow information may comprise ejected-material-information (which may be type, speed or amount) that is representative of material that is ejected by the harvester. The visual display may comprise a region of material being ejected by the harvester. The controller may be configured to set a size and/or visual property and/or flow-rate-property of the region of material being ejected by the harvester based on the ejected-material-information.

The received crop flow information may comprise air-pressure-information that is representative of air pressure at a specific point in a crop flow path through the harvester. The visual display may comprise a region of material being associated with the specific point in the harvester. The controller may be configured to set a visual property of the region of material based on the air-pressure-information.

The air-pressure-information may comprise air-pressure-differential-information across a sieve in the harvester. The visual display may comprise a region of material associated with a side of the sieve. The controller may be configured to set the size of the region of material based on the air-pressure-differential-information.

The machine setting value may comprise one or more of ground speed; rotor/threshing speed; concave clearance; fan speed; sieve opening; pre-sieve opening; upper sieve opening; and bottom sieve opening.

The display information may comprise a schematic illustration of a fan within the harvester. The controller may be configured to set a speed of rotation of the fan in the animation based on a machine setting value associated with the fan.

The display information may comprise a schematic illustration of a fan within the harvester and an arrow representing air flow away from the fan. The controller may be configured to set a visual property of the arrow in the animation based on a machine setting value associated with the fan.

The display information may comprise a schematic illustration of a threshing cylinder within the harvester. The controller may be configured to set a speed of rotation of the threshing cylinder in the animation based on a machine setting value (for example rotor speed or concave clearance) associated with the threshing cylinder.

The display information may comprise a schematic illustration of a chopper within the harvester. The controller may be configured to set a speed of rotation of the chopper in the animation based on a machine setting value associated with the chopper.

The display information may comprises a schematic illustration of a sieve within the harvester. The controller may be configured to set an opening size of the sieve in the animation based on a machine setting value associated with the sieve.

The machine-status-information may be indicative of whether a component in the harvester is in a normal-mode-of-operation or a failure-mode-of-operation, and optionally in a maintenance-due-mode-of-operation.

The controller may be further configured to automatically set one or more machine setting values based on the received crop flow information in accordance with an automatic control algorithm. The controller may be further configured to optionally receive an override operation from an operator; generate feedback information representative of crop flow information and/or machine setting values at a time at which the override operation was provided; and optionally modify one or more parameters of the automatic control algorithm.

The controller may be configured to receive measured crop flow information; set one or more properties of the animated crop flow based on the received measured crop flow information; receive a proposed-replacement-machine-setting-value; set simulated crop flow information in accordance with the proposed-replacement-machine-setting-values; set one or more properties of the animated crop flow based on the simulated crop flow information; and receive user input indicative of an instruction to accept or reject the proposed-replacement-machine-setting-values. The controller may be further configured to, upon receipt of an instruction to accept the proposed-replacement-machine-setting-values, set the machine setting values in accordance with the proposed-replacement-machine-setting-values, and set one or more properties of the animated crop flow based on measured crop flow information. The controller may be further configured to, upon receipt of an instruction to reject the proposed-replacement-machine-setting-values, maintain the machine setting values in accordance with their previous values; and set one or more properties of the animated crop flow based on measured crop flow information.

According to a further aspect, there is provided a method of controlling a harvester, the method comprising steps of receiving crop flow information representative of how crop is flowing through the harvester; generating display information for providing a visual display to an operator of the harvester, wherein the visual display comprises an animation of crop flowing through the harvester; and setting one or more properties of the animated crop flow based on the received crop flow information.

There may be provided a computer program, which when run on a computer, causes the computer to configure any apparatus, including a controller, machine, harvester, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM), or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

There may be provided an integrated circuit comprising any controller or apparatus disclosed herein, or configured to perform any method disclosed herein.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

One or more examples disclosed herein relate to a controller for a harvesting machine, which causes an animation of crop flow through the machine to be displayed to an operator of the machine. One or more properties of the animated crop flow can be set based on received crop flow information. For example, the received crop flow information can comprise measured values of crop losses obtained during use in the field. These measured crop losses can then be shown visually in the animation as an area/volume of crop that is being lost by the machine. In this way, user operability of the harvesting machine can be improved because complicated information relating to the harvesting machine can be made more comprehensible to the user. This can advantageously result in reduced crop losses during operation of the harvesting machine.

Figure 1:
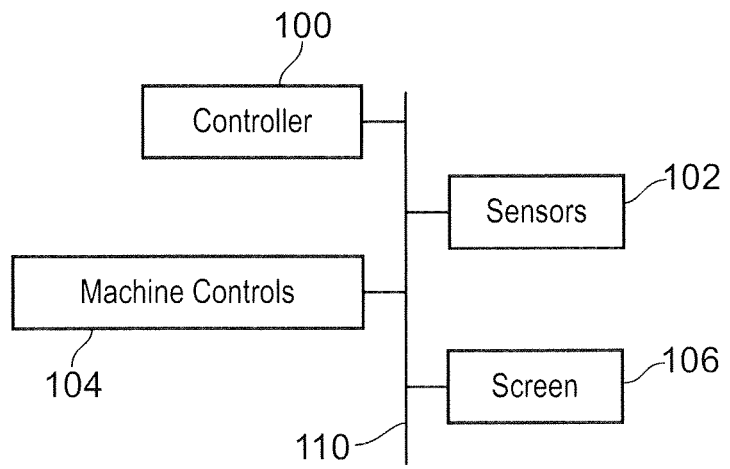
FIG. 1 shows schematically a number of modules or components of a harvester, including a controller thereof, in accordance with an exemplary embodiment of the present invention.

FIG. 1 shows schematically a number of modules or components of a harvester, in accordance with an exemplary embodiment of the present invention. The harvester may be a combine harvester, a forage harvester, or a fruit harvester, such as a grape harvester, as non-limiting examples. FIG. 1 shows a controller 100, one or more sensors 102, machine controls 104, and a screen 106, all connected together by a data bus 110. The one or more sensors 102 are discussed in more detail below, and can include crop flow sensors, moisture sensors, grain cameras, air pressure sensors, and sensors that can be used to determine that a component has failed or requires maintenance. At least some of the sensors 102 can provide crop flow information representative of how crop is flowing through the harvester. The machine controls 104 can include various controls for operating the harvester, such as a throttle for setting a ground speed, a control for setting a fan speed, and a control for setting the size of a sieve opening. In this way, the machine controls 104 can be used to adjust machine setting values of the harvester.

In this example, the controller 100 receives measured crop flow information from the one or more sensors 102. The controller 100 can also receive one or more machine setting values from the one or more sensors 102 and/or the machine controls 104. The controller 100 can process the crop flow information, and optionally the machine setting values, in order to generate display information for providing a visual display to an operator of the harvester. The visual display can be displayed on the screen 106, and can be an animation of crop flowing through the harvester. One or more properties of the animated crop flow is set by the controller 100 based on at least the received crop flow information. Examples of such properties will be discussed below with reference to the screen shots of FIGS. 2, 3, 4a and 4b.

Visually displaying the crop flow information in an animation can advantageously enable the complicated information relating to the harvester to be more comprehensible to an operator of the harvester. In modern harvesters, a great deal of data and information may be displayed to the operator. It can be difficult for the operator to interpret and determine how to adjust operation of the harvester based on the information. Therefore, using such an animation can improve user operability of the harvester. For examples in which an operator manually sets one or more of the machine setting values, an operator can more quickly and accurately change a machine setting in order to improve performance. This can beneficially result in a reduction of crop losses.

In particular, some parameters can have a "u" or "n" shaped optimization characteristic. For example, rotor losses in a combine harvester can be unacceptably high if a rotor speed is too high or too low. By displaying various information in an animation, as discussed herein, an operator can more intuitively and quickly determine what change in operating parameter (such as an increase or decrease in rotor speed) is likely to improve performance.

Furthermore, the crop flow information that is displayed in the animation provides an automatically generated visual indication about conditions prevailing in the harvester. As will be discussed below, these visual indications of the performance of the harvester can, in at least some examples, provide information as a prompt for human interaction with the harvester, for example to reduce crop losses and/or to be able to identify events that could lead to a malfunction of the harvester.

Figure 2:
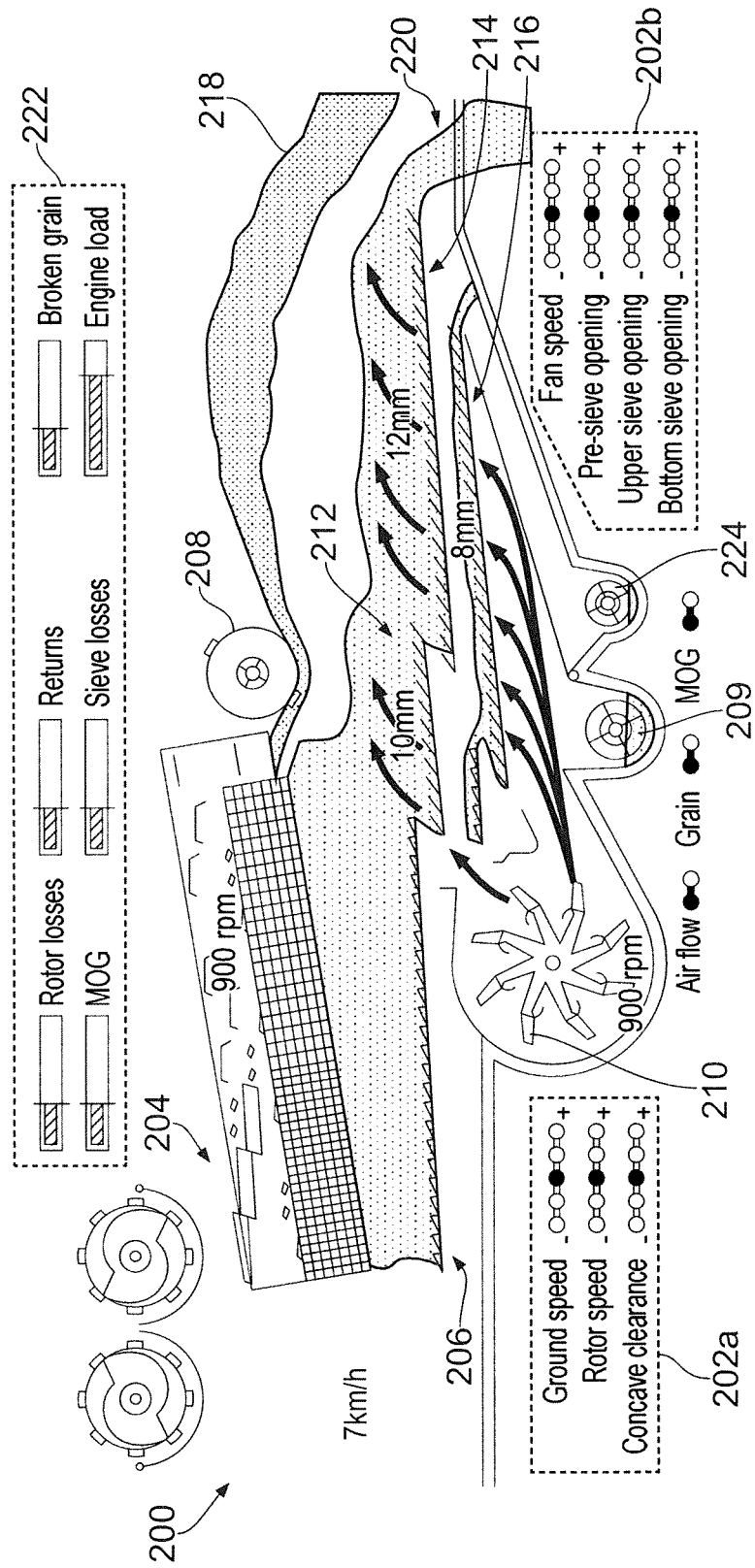
FIG. 2 shows an example screenshot of display information that can be generated by the controller of FIG. 1, in accordance with an exemplary embodiment of the present invention.

FIG. 2 shows an example screenshot 200 of display information that can be generated by the controller 100 and displayed by the screen 106 of FIG. 1 for presentation to an operator of the harvester as an animation, in accordance with an exemplary embodiment of the present invention. The screenshot 200 includes a schematic view of the harvesting machine, which in this example is a 2-dimensional schematic view through the combine harvester. Shown in FIG. 2 are the following example components of the combine harvester.

A threshing cylinder 204, which receives crop from a header (not shown). The threshing cylinder 204 rotates at a rotor speed. In FIG. 2, the crop moves through the threshing cylinder 204 from left to right. The threshing cylinder 204 includes concave grates that are intended to separate grain from straw, such that the grain can pass through the concave grates, but the straw cannot. Instead, the straw is moved across the concave grates until is exits the threshing cylinder 204 at a far end. The size of the concave grates can be set so as to define a concave clearance.

A chopper 208, which receives material (which should be mainly straw) from the far end of the threshing cylinder 204. The chopper 208 chops the material it receives, and ejects the chopped material from the harvester. This ejected material is shown with reference 218 in FIG. 2. Any grain that is present in this rotor-ejected material 218 can be referred to as rotor losses. As represented in FIG. 2, all of, or portions of, this rotor-ejected material 218 can be color coded in order to indicate the type of material that is present (for example, grain or material-other-than-grain (MOG)).

A grain pan 206, which receives material (which should be mainly grain) from the concave grates of the threshing cylinder 204. The grain pan 206 extends along the length of the threshing cylinder 204, and is moved such that it steps material along the grain pan 206 from left to right as it is shown in FIG. 2, until it falls off a far end of the grain pan 206.

A pre-sieve 212, an upper surface of which receives material from the far end of the grain pan 206. The pre-sieve is made up of fingers, which can be rotated in order to define a pre-sieve opening value. The pre-sieve opening value is set such that a desired amount of air can be blown upwardly through the pre-sieve 212 by a fan 210, in order to blow MOG away from the pre-sieve 212, yet allow grain to fall through the pre-sieve 212. In this way, the pre-sieve performs a cleaning operation. The size of the opening of the pre-sieve 212 as it is shown in the animation can be set based on an associate machine setting value.

A fan 210, that blows air through the pre-sieve 212, and also blows air through an upper sieve 214 and a bottom sieve 216. A fan speed of the fan 210 can be controlled as a machine setting.

An upper sieve 214, an upper surface of which receives material that has not passed through the pre-sieve 212. The upper sieve 214 has an upper sieve opening value, which is a similar parameter to the pre-sieve opening value. Material that is blown away from the top surface of the upper sieve 214 is ejected from the combine harvester, and is shown with reference 220 in FIG. 2. Any grain that is present in this sieve-ejected material 220 can be referred to as sieve losses.

A bottom sieve 216, an upper surface of which receives material that has passed through the pre-sieve 212 or the upper sieve 214. The bottom sieve 216 has a bottom sieve opening value, which is a similar parameter to the pre-sieve opening value. Material that passes through the bottom sieve 216 (which should be mainly grain) is collected and passed to a grain auger 209, which in turn transports the grain to a grain tank (not shown). Material that is blown away from the top surface of the bottom sieve 216 is collected and passed to a re-cleaning auger 224 for transferring back to an earlier stage in the cleaning process for reprocessing. The amount of material collected in the re-cleaning auger 224 can be referred to as "returns".

The screenshot 200 also illustrates graphically the following machine settings of the machine controls 104, which are identified with references 202a and 202b in FIG. 2. Each of the machine settings can be set to a number between 1 and 5. Also, the actual values for some of the machine settings are shown in the schematic of the combine harvester, alongside the associated component. These exemplary machine settings are:

Ground speed (7 km/h in this example).
Rotor speed (900 rpm).
Concave clearance.
Fan speed (900 rpm).
Pre-sieve opening (10 mm).
Upper sieve opening (12 mm).
Bottom sieve opening (8 mm).

As will be discussed below, these machine setting values 202a, 202b can be set manually by a user, or can be set automatically by a controller, such as the controller 100.

The screenshot 200 also illustrates graphically, as bar charts, various crop flow information, which are identified with reference 222 in FIG. 2. This crop flow information can be measurement values returned by crop flow sensors 102 in the material flow path through the combine harvester. Each of the bar charts has a marker that represents a transition between acceptable and unacceptable performance. In FIG. 2, the bar charts show that each value of crop flow information is at an acceptable level. In FIG. 2, the crop flow information shown is:

Rotor losses.
Returns (the amount of material transferred by the re-cleaning auger 224).
Broken grain, collected by the grain auger 209.
Material other than grain (MOG).
Sieve losses.
Engine load.

The animation can show: schematic illustrations of parts of the combine harvester that move; or material that moves during operation, as moving in a corresponding way in the animation. This can include: any parts that rotate during use as rotating in the animation (for example, the threshing cylinder 204, the chopper 208, the fan 210, etc.); and grain/straw that is moved during use as being in motion (for example, the rotor-ejected material 218 as it is ejected from the rotor 208, the sieve-ejected material 220 is it is ejected from the upper sieve 214. etc.). The animation can also show schematically parts of the harvester that move or are stationary during use, such as the sieves 212, 214, 216, the grain pan 206, and the concave grates. The speed of rotation and/or motion in the animation can be set based on crop flow information and/or machine setting values, as appropriate.

Also, the way in which the animation is displayed can be based on machine-status-information. The machine-status-information can be representative of the status of the machine, which may be the machine as a whole, or one or more components of the machine. For example, the machine-status-information can include information that is indicative of whether one or more specific components (such as the rotor 208, the threshing cylinder 204, the chopper 208, etc.) in the combine harvester is in one or more of a normal-mode-of-operation, a failure-mode-of-operation, or a maintenance-due-mode-of-operation.

The crop flow information represented by FIG. 2 can be measured by the following example sensors 102, or determined from measurements made by the following sensors 102.

Crop flow sensors for measuring an amount of material passing the sensor, for example in tonnes per hour. This type of sensor can be used to measure the rotor-ejected material 218, sieve-ejected material 220, material that passes through the concave grates of the threshing cylinder 204, material that passes through one or more of the sieves 212, 214, 216, material entering the grain auger 209, material entering the re-cleaning auger 210, material being transported to a grain tank (not shown), etc. A crop flow sensor can provide material-flow-rate-information.

Material-type sensors can be used to measure a type of material passing the sensor. Such a sensor can be implemented as an impact sensor or a grain camera, for example. This type of sensor can be used in the same locations as mentioned above for crop flow sensors, and can distinguish between grain, MOG and broken grain. A material-type sensor can provide material-type-information.

Mass sensors can be used to measure a mass of grain or other material, for example a mass of grain that is passed to the grain auger 209 or the re-cleaning auger 224. A mass sensor can provide amount-of-material-information.

Distance sensors can be used to measure the size of opening and clearances in the crop flow path, for example the concave clearance and the size of the openings of the sieves 212, 214, 216.

Feed rate sensors can be used to measure the amount of material that is being fed into the combine harvester.

Moisture sensors can be used to measure a moisture level associated with material in the crop flow path, and provide material-moisture-information. For example, a moisture level of grain that is collected by the grain auger 209 can be measured by such a sensor.

Rotation speed sensors, can be used to measure the speed of any component that rotates, including rotors associated with the threshing cylinder 204, and the fan 210. This type of sensor can also be referred to as an RPM (revolutions per minute) sensor.

Grain cameras (which may be referred to as grain cams) can be used to capture images of material as it passes through the combine harvester. For example, a grain cam may be used to capture images as material is transferred from the grain auger 209 to a grain tank (not shown). Such images can be used to determine different types of material, and material flow rates, for example.

Air pressure sensors can be used to measure air pressure at various points in the crop flow path through the combine harvester and provide these measurements as air-pressure-information. In some examples, differential air pressure sensors can be used. A differential air pressure sensor can have a first inlet and a second inlet, which can be located either side of one of the sieves 212, 214, 216, for example. In this way, air-pressure-differential-information across the sieve 212, 214, 216 can be determined.

Any of the above sensors that is associated with a region of the crop flow path that ejects material from the combine harvester can be considered as providing ejected-material-information.

Machine-status-information of the combine harvester can be measured by the following example sensors 102, or determined from measurements made by the following sensors 102:

Sensors detecting the rotational speed of rotating elements like (but not limited to) threshing rotors, chopper and/or spreader units, grain elevators, grain augers, feeder drive system, sieve and grain pan drives, etc. Unexpected slowing down of such elements may indicate the onset of a technical problem. In a simpler version, instead of measuring a speed, such sensors may only detect whether or not the element is moving/rotating.

Temperature sensors indicating when there is a cooling problem somewhere in the machine.

Sensors indicating that a door is open when it should be closed.

Internal counters may be used for indicating when certain elements are due for maintenance. For example, a number of active hours or a total weight of crop material processed by a certain element may be an indication that maintenance is due. More complex algorithms may also take into account additional information like applied force, operating speed or temperature and humidity when active.

As indicated above, one or more properties of the animated crop flow and/or components of the combine harvester can be set based on the crop flow information and/or machine setting values and/or machine-status-information. Examples of which will be discussed below.

The size of the rotor-ejected material 218 and/or the sieve-ejected material 220 can be set based on amount-of-material-information, for example as provided by a crop flow sensor. The "size" of any material disclosed herein can include an area, a height, a layer thickness, a volume (or a cross-section thereof) and/or a density of material flow.

A flow-rate-property can be set based on material-flow-rate-information, for example as provided by a crop flow sensor. For example, a visual property can be set by adjusting a speed of motion of pixels through a region of material. The region of material may be associated with a specific point in the harvester, for example the rotor-ejected material 218 associated with the chopper 208 and/or the sieve-ejected material 220 associated with the upper sieve 214.

A visual property, such as the color/appearance, of the rotor-ejected material 218 and/or the sieve-ejected material 220 can be set based on one or more measurements taken by a material-type sensor/grain cam/moisture sensor. These measurements can include material-type-information, material-flow-rate-information, and material-moisture-information. For example, grain can be displayed with a first color, and MOG can be displayed with a second, different color. In one example, if 90% of the material is determined to be grain, and 10% is MOG, then 90% of the area of the rotor-ejected material 218 can be displayed in the first color and 10% can be displayed in the second color. Also, a color of the material, or a pattern that is shown in the animation, can be set based on a measured moisture level of the material.

The size of a region material displayed on top of a sieve can be set based on a measured air pressure differential across the sieve, for example provided as air-pressure-information and/or air-pressure-differential-information, as provided by an air pressure sensor.

Air-flow arrows can be shown leaving the fan 210, and/or on either side of one or more of the sieves. The appearance of these arrows (for example, the length and thickness) can be set based on measurements recorded by an RPM sensor associated with the fan 210, and/or air flow/pressure sensors associated with the sieves 212, 214, 216. Also, the appearance of these arrows can be set based on machine-status-information. For example, if the machine-status-information is indicative of a fault with the fan 210 then the arrows may be removed from the animation altogether, or they may be illustrated with a specific color or appearance.

The amount of material shown in the grain auger 209 and/or the re-cleaning auger 224 can be set based on measurements taken by crop flow sensors and/or mass sensors.

A visual property, such as the color/appearance, of the material in the grain auger 209 and/or the re-cleaning auger 224 can be set based on measurements taken by a material-type sensor/grain cam/moisture sensor.

A visual property, such as the color/appearance, of material at any stage in the crop flow through the combine harvester can be set based on measurements taken by a material-type sensor/grain cam/moisture sensor. In addition to the examples discussed above, any stage in the crop flow can include the material between the threshing cylinder 204 and the grain pan 206, the material passing through a sieve 212, 214, 216, and material that is blown away from an upper surface of a sieve 212, 214, 216.

The speed at which the fan 210, chopper 208 and/or threshing cylinder 204 rotate in the animation can be set based on a measurement taken by a RPM sensor, or can be based on associated machine setting values. Also, the speed at which these components rotate in the animation can be set based on machine-status-information. For example, if the machine-status-information is indicative of a fault with a particular component, then that component may be shown in the animation as stationary, or may be illustrated with a specific color or appearance.

The openings in the sieves, 212, 214, 216, as they are shown in the animation, can be set based on associated machine setting values and/or measurements taken by a distance sensor.

An amount of material, or any other visual property of the material, flowing through one or more of the sieves 212, 214, 216, as it is shown in the animation, can be set based on associated machine setting values and/or measurements taken by a crop flow sensor, material-type sensor, mass sensor, or air pressure sensor.

The amount of material shown entering the threshing cylinder 204 can be based on measurements taken by a feed rate sensor.

A video display of images captured by a grain cam can be shown in the animation at a location relative to the schematic illustration of the combine harvester that corresponds to the point in the crop flow at which the images were recorded, for example in the vicinity of the grain tank where there is less dust.

A visual property, such as the color/appearance, of any component in the combine harvester can be set based on the machine-status-information. For example, if the machine-status-information is indicative of a fault with a particular component, then that component may be shown in the animation as stationary and/or may be illustrated with a specific appearance or color (such as the color red to draw attention to it). If the component is not visible in the animation, for example because a 3D representation of the combine harvester is being displayed and the component is obscured, then a viewing angle of the combine harvester can be set based on the machine-status-information such that the component is visible in the animation. This can be considered as providing auto-rotate functionality based on the machine-status-information One or more of the properties of the crop flow described above (including the size of the rotor-ejected material 218, flow rate properties, etc.) can also be set based on the machine-status-information. For example, if the machine-status-information indicates that a specific component is in a failure-mode-of-operation, then a visual property of a region of crop either immediately before or immediately after the component can be set based on the machine-status-information. Display of such a visual property may be in addition to any measured changes in crop flow from an appropriate crop flow sensor.

The size of a component in the animation can be set based on the machine-status-information. For example, if the machine-status-information indicates that a specific component is in a failure-mode-of-operation, then the size of that component in the animation can be increased. This can involve zooming in on the entire image to enlarge the component, or can involve increasing the size of the component in question without increasing the size of the other components. This can be considered as providing auto-zoom functionality based on the machine-status-information.

Figure 3:
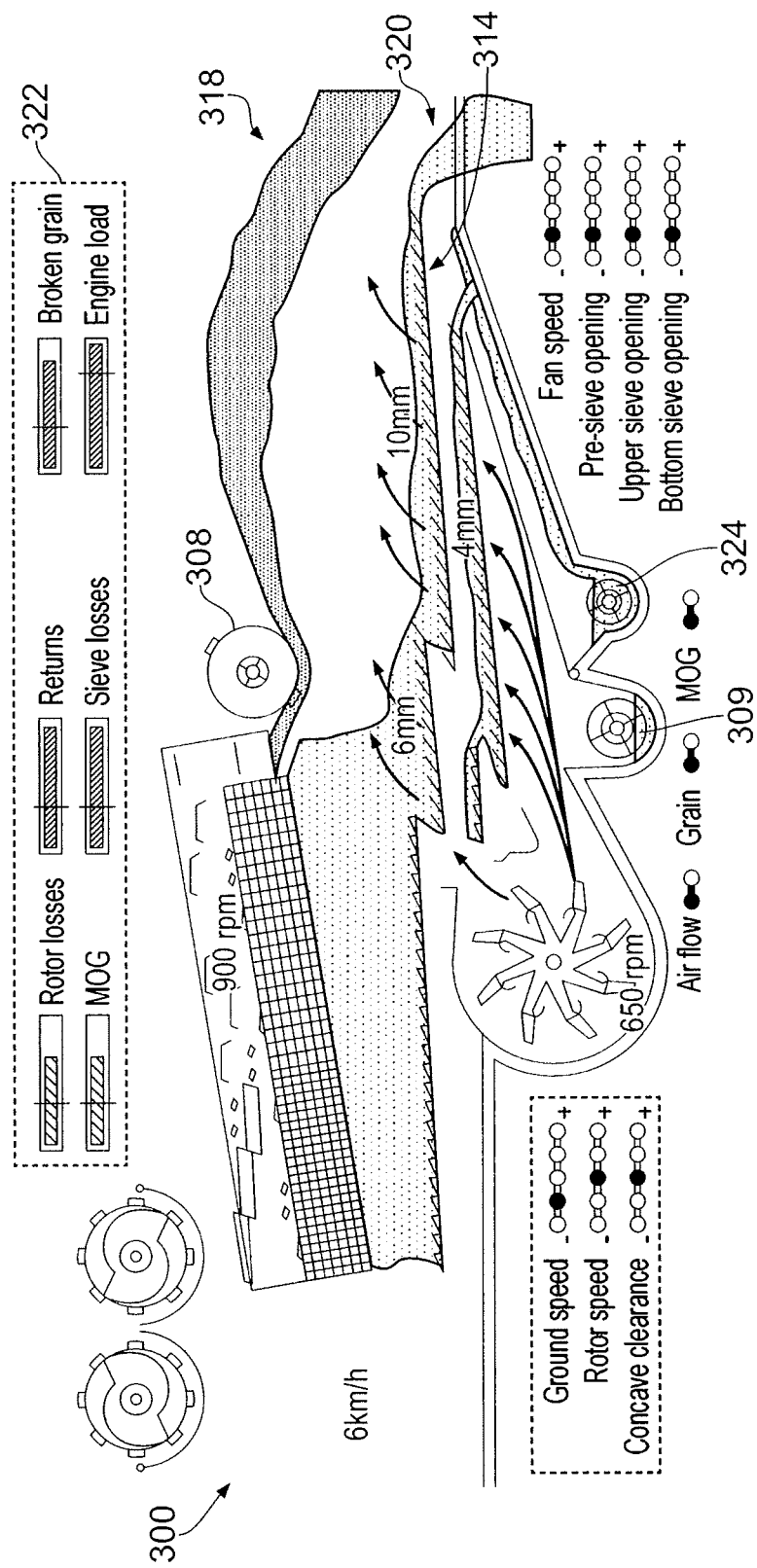
FIG. 3 shows another example screenshot of display information that can be generated by the controller of FIG. 1, in accordance with an exemplary embodiment of the present invention.

FIG. 3 shows another example screenshot 300 of display information that can be generated by the controller 100 and displayed by the screen 106 of FIG. 1, which is displayed to the user as an animation, in accordance with an exemplary embodiment of the present invention. When compared with FIG. 2, in FIG. 3 the ground speed is slower (6 km/h, instead of 7 km/h); the fan speed is slower (650 rpm, instead of 900 rpm); the pre-sieve opening is smaller (6 mm, instead of 10 mm); the upper sieve opening is smaller (10 mm, instead of 12 mm); and the bottom sieve opening is smaller (4 mm, instead of 8 mm).

The screenshot 300 of FIG. 3 also illustrates graphically, as bar charts, the same types of crop flow information that are shown in FIG. 2. This information is identified with reference 322. In FIG. 3, the bar charts show that each value of crop flow information is at an unacceptable level. The unacceptable crop levels in FIG. 3 can be illustrated in the animation as follows:

Rotor losses: a large area of grain-colored material in the rotor-ejected material 318 being ejected by the chopper 308. The unacceptably high rotor losses can also be shown by setting the color and/or pattern of the rotor-ejected material 318, and/or a speed of material moving through the rotor-ejected material 318.

Returns: a large area of grain-colored material in the re-cleaning auger 324.

Broken grain: a large area of a certain color of material in the grain auger 309. For example a relatively high proportion of material in a color that is associated with broken grain (not shown in FIG. 3).

MOG: a large area of a certain color of material in the grain auger 309. For example a relatively high proportion of material in a color that is associated with MOG (not shown in FIG. 3).

Sieve losses: a large area of grain-colored material in the sieve-ejected material 320 being ejected from the upper sieve 314.

Figure 4A:
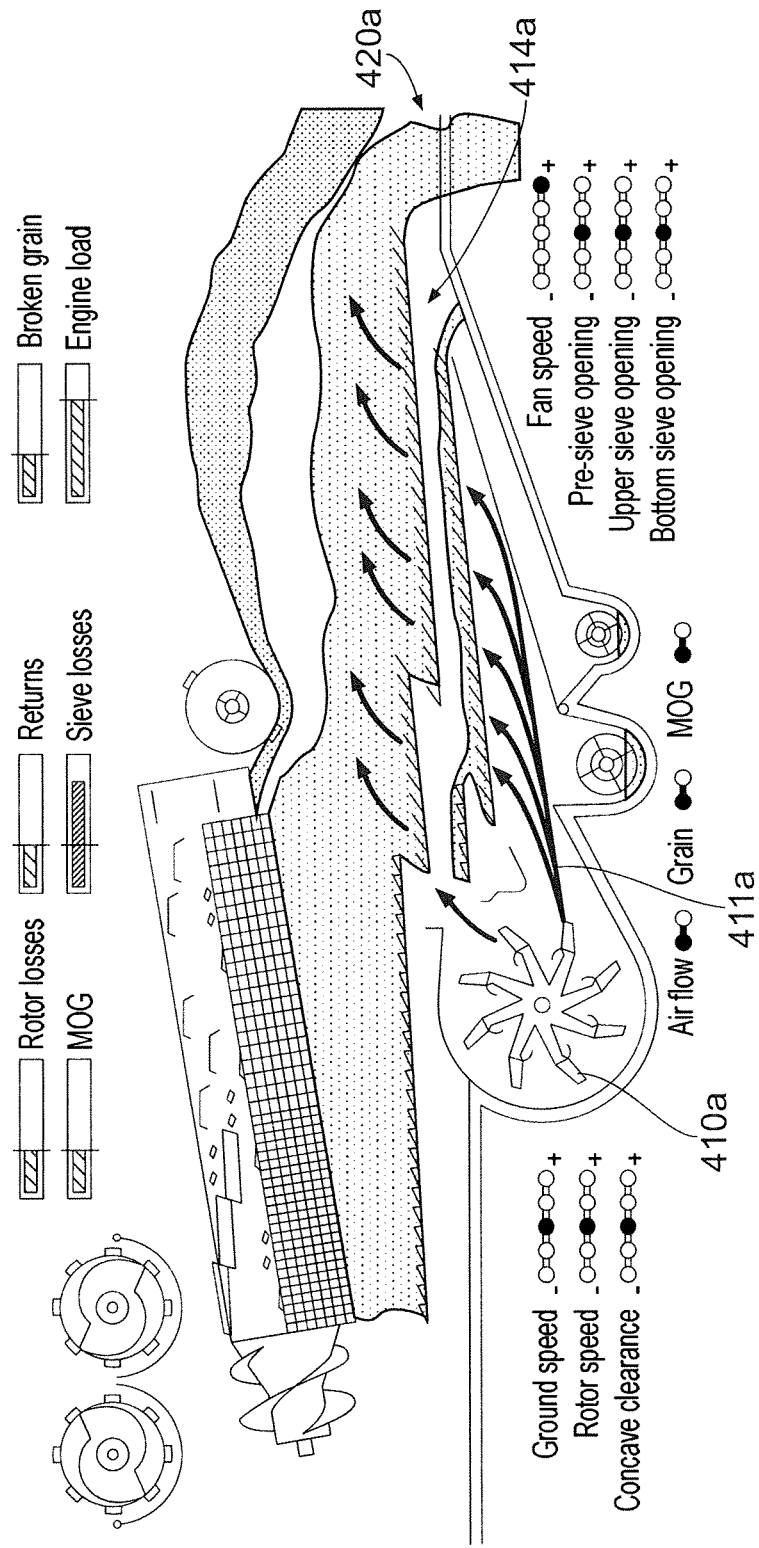
FIGS. 4a and 4b show two screenshots of animations that illustrate different operating conditions of a combine harvester, in accordance with an exemplary embodiment of the present invention.
Figure 4B:
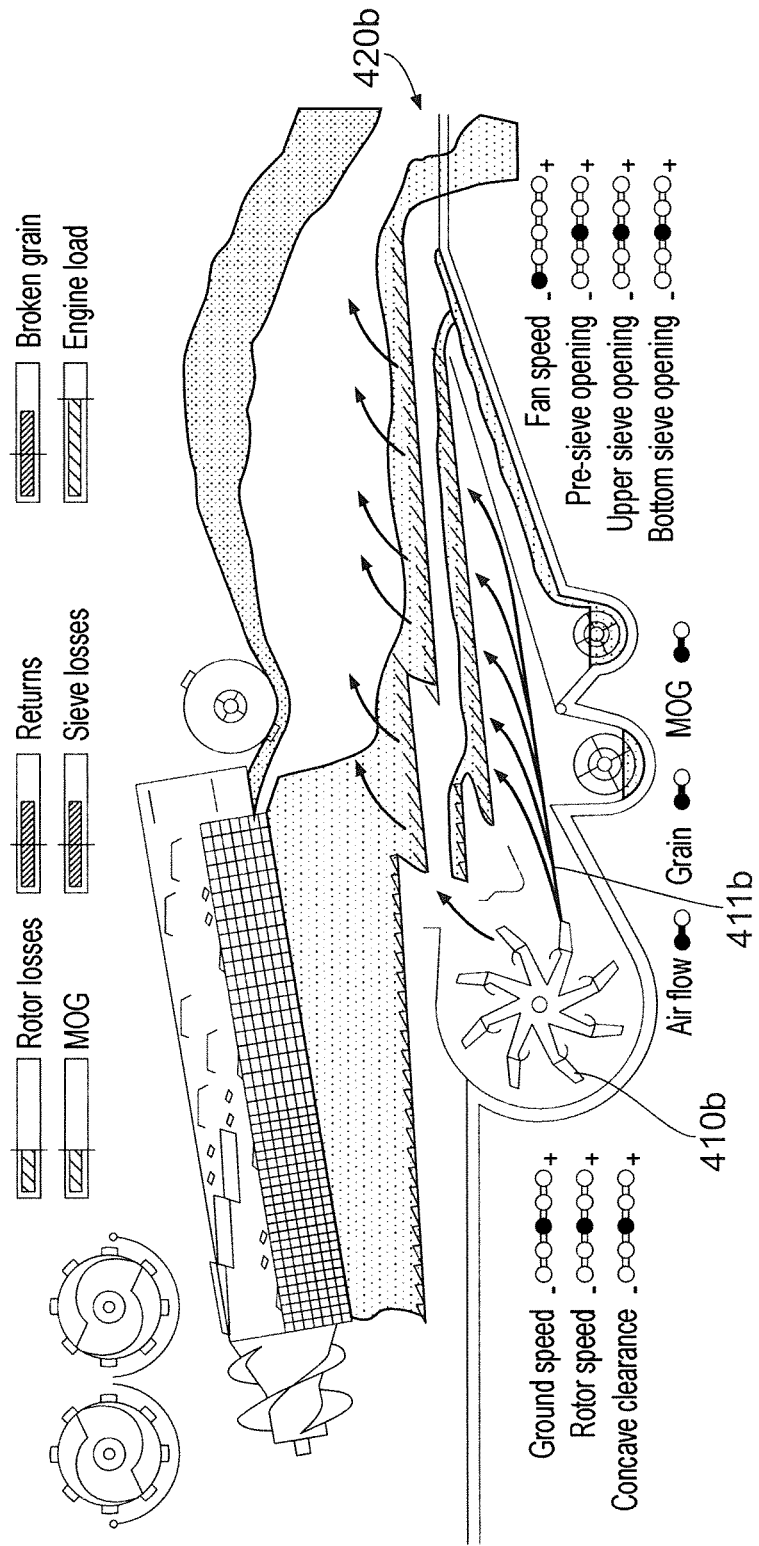

FIGS. 4a and 4b show two screenshots of animations that illustrate different operating conditions of a combine harvester, in accordance with an exemplary embodiment of the present invention. Features of FIGS. 4a and 4b that have already been described with reference to FIG. 2 or FIG. 3 will not necessarily be described again here.

In FIG. 4a, the speed of the fan 410a is set at a maximum value, which causes high grain losses in the sieve-ejected material 420a. Air flow arrows 411a are shown leaving the fan 410a with thick lines, in order to show this high fan speed. The high grain losses are illustrated in FIG. 4a by a large area of grain-colored material in the sieve-ejected material 420a. In FIG. 4a, the total area of the sieve-ejected material 420a is also large, which can be set by the controller based on a determined value for the air pressure difference across the upper sieve 414a, for example. The sieve losses in FIG. 4a can be referred to as "blow out losses," because the fan speed is too high.

In FIG. 4b, the speed of the fan 410b is set at a minimum value, whilst the other machine settings are the same as for the screenshot of FIG. 4a. Air flow arrows 411b are shown leaving the fan 410a with thin lines, in order to show this low fan speed. The high grain losses are again present in the sieve-ejected material 420b. This is illustrated in FIG. 4b by a large area of grain-colored material in the sieve-ejected material 420b. However, in contrast to FIG. 4a, the total area of the sieve-ejected material 420b in FIG. 4b is relatively small. This means that the proportion of grain in the sieve-ejected material 420b is larger in FIG. 4b. The sieve losses in FIG. 4b can be referred to as "sieve off losses", because the fan speed is too low.

It will be appreciated from the example of FIGS. 4a and 4b, that the use of the animated display can enable an operator to more readily appreciate a reason for sub-optimal performance (such as high sieve losses), and therefore the operator can more quickly and efficiently adjust one or more machine settings of one or more respective machine controls 104 in an appropriate way to improve performance. The effect of the fan speed machine setting on the sieve losses crop flow information is an example of a "u" or "n" shaped optimization characteristic inasmuch as performance is sub-optimal if the fan speed is too high or too low.

In addition to causing an animation to be displayed to an operator, in some examples the controller 100 of FIG. 1 can also automatically control/set one or more machine setting values of one or more respective machine controls 104 based on received crop flow information from a respective sensor 102 in accordance with an automatic control algorithm. For example, the controller 100 can process the crop flow information and automatically determine one or more replacement-machine-setting-values. The replacement-machine-setting-values may, or may not, be different to current machine setting values of machine controls 104.

Advantageously, use of this automatic control in combination with the animated display on the screen 106 can enable an operator to determine when to provide an override operation. Such an override operation can be provided by an operator when the automatic control appears to be sub-optimal. In this way, the operator can override the automatic control of machine controls 104 in the expectation of achieving improved performance. The override operation can be an instruction to increase or decrease a machine setting value of a respective machine control 104, for example.

Also, the controller 100 can optionally generate feedback information for improving an automatic control algorithm based on an operator's input, for example to override the automatic control. This feedback information may comprise details of the crop flow information and/or machine setting values at a time at which an operator provides an override operation, and also optionally details of the override operation. Such details of the override operation can include which machine setting was changed, and how it was changed (for example whether it was increased or decreased). This feedback information can be automatically used by the controller to modify one or more parameters of an automatic control algorithm. It will thus be appreciated that even when manual control of the harvester is not being used, an improved understanding of what is happening inside the harvester can be considered a significant advantage and can result in better overall control of the machine.

It will be appreciated that any of the examples disclosed herein can be used to provide real-time feedback to an operator of a harvester whilst they in the field, in which case the crop flow information is received from one or more sensors 102. Also, the controller 100 can be used as part of a simulation tool, for example to provide training for operators of combine harvesters. In which case, computer software can generate simulated crop flow information for the controller based on machine setting values that have been entered by a user, and properties of the animation can then be set based on the simulated crop flow information.

Advantageously, use of an animated crop flow through a harvester as a simulation tool can provide a better overview of what is going on. A single movie can be used for training operators (optionally offline) and in a way that they will very rapidly understand what is going on in their harvester, without a need to be able to interpret many, for example more than ten, sensor values and graphs.

Figure 5:
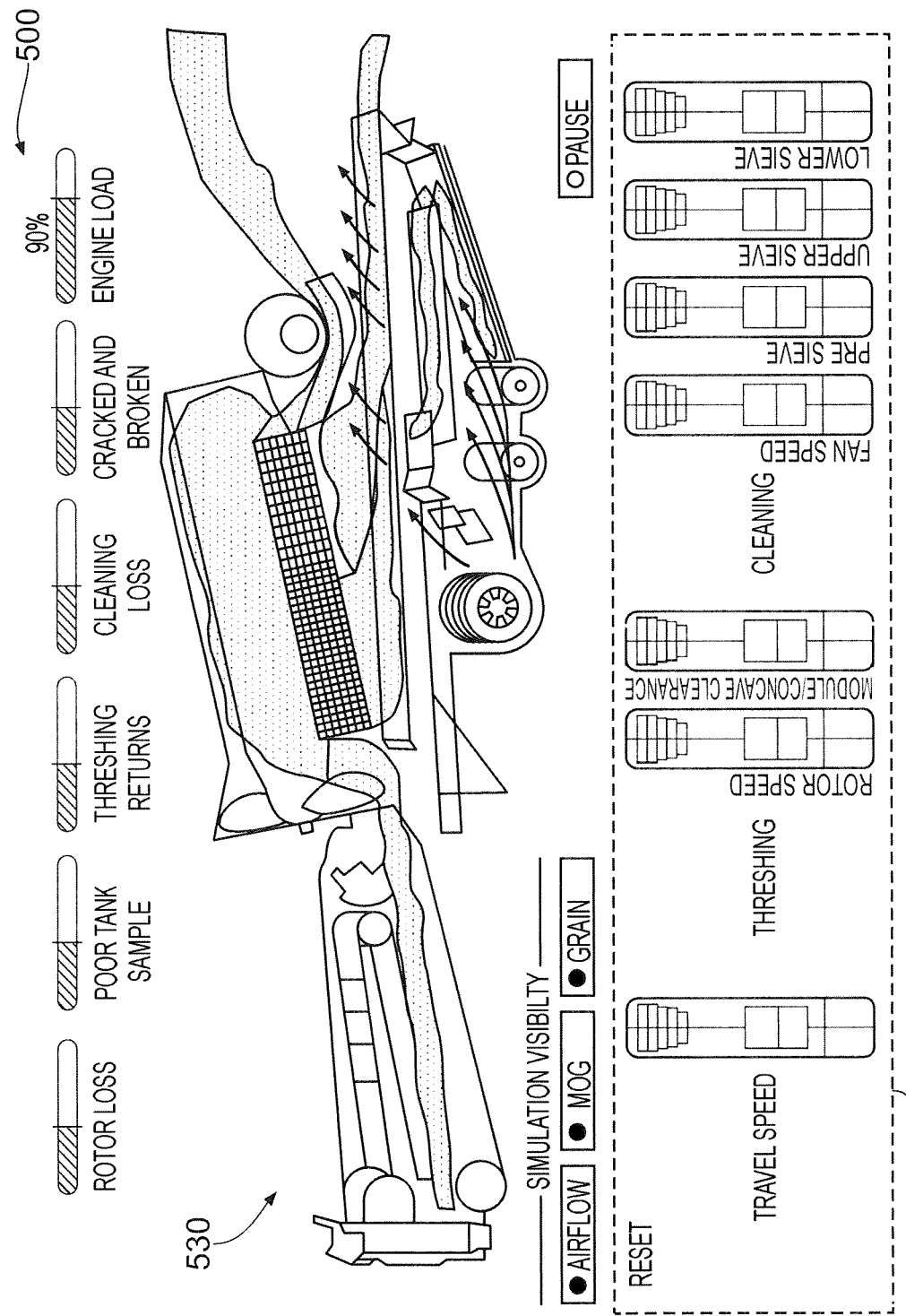
FIG. 5 shows a further screenshot of display information that can be generated by the controller of FIG. 1, in accordance with an exemplary embodiment of the present invention.

FIG. 5 shows a further screenshot 500 of display information that can be generated by the controller 100 of FIG.

1, and shown to an operator of the harvester in the screen 106 as an animation, in accordance with an exemplary embodiment of the present invention. In this example, a 3-dimensional schematic view through the combine harvester is shown. In addition to the components of the combine harvester that are shown in FIGS. 2, 3, 4*a*, and 4*b*, a header 530 of the combine harvester is shown in FIG. 5. One or more properties of the header 530 and/or crop flowing through the header 530 as it is displayed in the animation, can be set based on received crop flow information and/or machine setting values.

In FIG. 5, a machine-setting-panel 532 displays machine settings of the machine controls 104, with associated sliders for setting their values. In one example, use of these sliders can be particularly convenient when the animation used as a simulation tool. In some examples, especially examples that display an animation that is based on measured crop flow information provided by the sensors 102 as opposed to simulated crop flow information, the machine-setting-panel 532 may not be displayed to a user on the same display screen as the animation.

Figure 6:
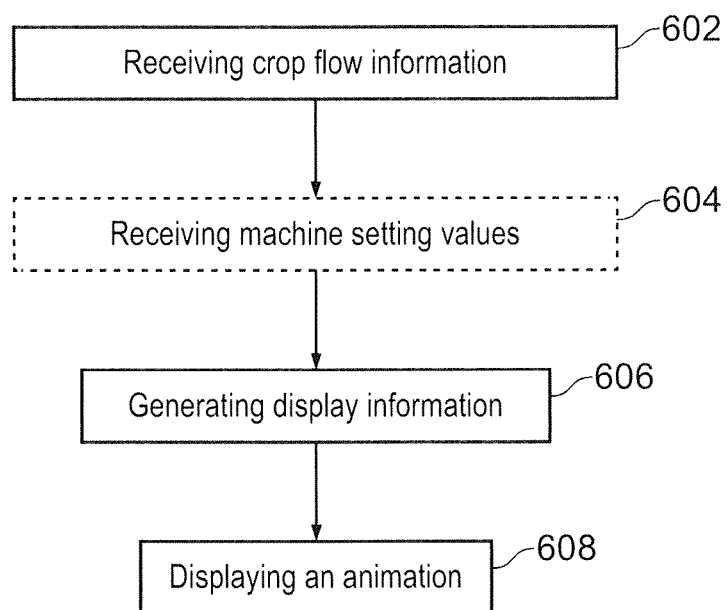
FIG. 6 shows schematically an example of a method for controlling a harvester, the method performed by the controller of FIG. 1, in accordance with an exemplary embodiment of the present invention.

FIG. 6 shows schematically an example of a method for controlling a harvester, in accordance with an exemplary embodiment of the present invention. The method may be performed by hardware and/or software associated with the harvester, such as by the controller 100, or remotely from a harvester for simulating operation of a harvester. At step 602, the method includes receiving crop flow information representative of how crop is flowing through the harvester. As discussed above, this crop flow information may be received from the sensors 102 associated with the harvester whilst it is in use in the field. Alternatively, the crop flow information may be generated by software when the method is used as a simulation tool. In addition to receiving the crop flow information, optionally, the method may comprise receiving machine setting values from the machine controls 104 at step 604.

At step 606, the method comprises generating display information for providing a visual display in the screen 106 to an operator of the harvester. The visual display comprises an animation of crop flowing through the harvester. One or more properties of the animated crop flow is set based on the received crop flow information, and the machine setting values if they have been received. Examples of how this step can be performed are discussed in detail above. In an exemplary embodiment, the controller 100 generates the display information in the step 606. Then, at step 608, the animation is displayed in the screen 106 to the operator of the harvester. In an exemplary embodiment, the controller 100 provides the animation to the screen 106 for display therein.

The animations disclosed herein can be used to show real-time information, or can be used for simulation purposes. In addition the animations can be used as part of a hybrid system that includes both measured (real-time) crop flow information and simulated crop flow information. In such a system real time information can initially be displayed. In this way, one or more properties of an animated crop flow can be set based on measured crop flow information. A user can then select a proposed-replacement-machine-setting-value. Additionally or alternatively, a proposed-replacement-machine-setting-value can be automatically suggested by the controller 100. In the hybrid system, the controller 100 may not immediately adjust the physical components of the harvester in line with the proposed-replacement-machine-setting-values. Instead, the controller 100 may set simulated crop flow information in accordance with the proposed-replacement-machine-setting-values. That is, the controller 100 can perform a simulation algorithm to determine the simulated crop flow information such that the likely effect on the crop flow of the proposed-replacement-machine-setting-values can be displayed.

The controller 100 can then set one or more properties of the animated crop flow based on the simulated crop flow information such that an animated crop flow can be displayed on the screen 106 based on the simulated crop flow information. The simulated properties of the animated crop flow that are set in this way may be displayed with visual characteristics that are different to properties based on measured crop flow information. For example, a simulated crop flow animation may be a different color to a measured crop flow animation. In this way, a user can easily distinguish between animations based on measured and simulated information.

After the controller 100 has caused a simulated crop flow animation to be displayed in the screen 106, it may be configured to receive user input indicative of an instruction to accept or reject the proposed-replacement-machine-setting-values of the machine controls 104. Upon receipt of an instruction to accept the proposed-replacement-machine-setting-values, the controller 100 can set the machine setting values of the machine controls 104 in accordance with the proposed-replacement-machine-setting-values (thereby adjusting the settings of physical components of the harvester), and can return to displaying animated crop flow in the screen 106 based on measured crop flow information from the sensors 102. Alternatively, upon receipt of an instruction to reject the proposed-replacement-machine-setting-values, the controller 100 can maintain the machine setting values of the machine controls 104 in accordance with their previous values, and return to displaying animated crop flow based on measured crop flow information from the sensors 102. Advantageously, in this example the user is provided with an opportunity review the likely effect of changing a machine setting value in a particular way, before actually changing a machine setting of the harvester.

Examples disclosed herein relate to showing an operator of a harvester machine a simplified but clear animation of the actual process inside the harvester, so that they can better understand what is happening. This can be easier to interpret than showing only individual sensing parameters to the operator. It has been found that individual readings, such as the following, can be difficult for an operator to follow: sensors to measure loss, engine load, settings etc.; readings in relation to automation; and also cleaning system load, broken grain, etc. If too much data is shown to the operator in this way, it can be easy to overlook sub-optimal performance and not notice high losses. It can be a lot clearer to the operator if the actual crop flow is shown through an animation on the screen of the harvester, which shows how the crop is flowing and where overloads and losses are occurring. That is, a movie of an animation can be played, in which the content is representative of (i) the actual process (crop flow) inside the harvester, in combination with (ii) the actual settings of the harvester, for example, settings relating to the concave, rotor, sieves, fan. Also, especially for combine automation, it can be clearer to see what the system is doing and why.

On the screen 106, the operator can see an animation or representation of the harvester, such as a cross section in 2D or 3D of the harvester. When he or she engages the various elements of the harvester, the operator can actually see the rotor turning, sieves moving etc. When the crop enters the harvester, the crop can be shown in the animation, including the flows of collected and lost grains. The magnitude of the flows that are shown in the animation can be proportional to the actual values measured by different sensors 102 inside the harvester.

Examples disclosed herein can provide feedback to an operator in such a way that information relating to operating conditions of the harvester can be interpreted more accurately by the operator. In this way, the operator can be provided with accurate information about the crop flow through the harvester such that any mismatch between what the operator sees and what is actually taking place can be reduced.

Examples disclosed herein can display, not only the layout of components of the combine harvester and their settings, but also indications of what happens with the crop inside machine based on live data. Optionally, cameras can also be installed within the harvester, and the captured images can be displayed in combination with the animation. In some examples the captured images can be displayed at a region of the schematic drawing of the harvester that corresponds to the position of the camera in the harvester. However, in combine harvesters, the process can be too dusty at various points in the crop flow path to use cameras. In which case, the examples disclosed herein of displaying an animation that is based on actual sensor data can be particularly advantageous.

Furthermore, in examples that set a property of the animation based on machine-status-information, the user can quickly and clearly understand the nature and severity of a failure. This can be because the animation can provide a practical representation of a problem, and also how it is affecting crop flow through the machine. Therefore, displaying this machine-status-information in an animation can enable the machine to better maintained, and can enable harvesting to be performed more efficiently and effectively with potentially less downtime of the machine when a failure occurs. In contrast, if such machine-status-information were displayed to a user in textual form, for example by a pop-up text box, then the user may be less likely and less able to react to a failure in a timely and appropriate way.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A control system for a harvester, the control system comprising:
   a controller; and
   a memory storing a computer program in machine-readable form that, when executed by the controller, configures the controller to:
      receive crop flow information providing an indication of how harvested crop is flowing along a crop flow path within the harvester;
      receive a captured image of the harvested crop at a given location within the harvester;
      generate display information for providing a visual display associated with the crop flow within the harvester, the visual display including both an animation-based visual representation of the crop flow within the harvester and an image-based visual representation of the harvested crop including the captured image; and
      adjust one or more display properties associated with the animation-based visual representation based on the received crop flow information to provide an animated view of the crop flow within the harvester.

2. The control system of claim 1, wherein the captured image is received from a camera installed within the harvester.

3. The control system of claim 1, wherein the animation-based visual representation is displayed in association with a schematic visual representation of one or more internal components of the harvester.

4. The control system of claim 3, wherein the image-based visual representation is displayed relative to the schematic visual representation of the one or more internal components of the harvester.

5. The control system of claim 1, wherein the controller is configured to adjust the one or more display properties based on the received crop flow information such that the animated view provides a visual indication of an amount of crop flowing between first and second locations within the harvester.

6. The control system of claim 5, wherein the first and second locations are associated with at least one of a threshing cylinder of the harvester or one of a pan or sieve of the harvester.

7. The control system of claim 1, wherein the controller is configured to adjust the one or more display properties by adjusting a position or relative height of a line within the visual display that represents an amount of crop flowing across various locations within the harvester along the crop flow path.

8. The control system of claim 1, wherein the controller is further configured to automatically control an operation of at least one electronically controllable component of the harvester to adjust the crop flow through the harvester based on an input received from an operator of the harvester.

9. A control system for a harvester, the control system comprising:
   a controller; and
   a memory storing a computer program in machine-readable form that, when executed by the controller, configures the controller to:
      receive crop flow information providing an indication of how crop is flowing along a crop flow path within the harvester;
      receive operating information associated with an operating state of one or more internal components of the harvester;
      generate display information for providing a visual display associated with the operation of the harvester, the visual display including both a visual representation of crop flow within the harvester along at least a portion of the crop flow path and a visual representation of at least one of the one or more internal components or the operating state of the one or more internal components; and
      adjust one or more display properties of the visual display based on variations in the received crop flow information indicative of a change in an amount of crop flow within the harvester to provide a time-varying animated view of the crop flow along the at least a portion of the crop flow path.

10. The control system of claim 9, wherein the visual representation of the at least one of the one or more internal components or the operating state of the one or more internal components comprises a schematic visual representation of the one or more components, the schematic visual representation being displayed relative to the time-varying animated view of the crop flow.

11. The control system of claim 10, wherein the visual representation of the at least one of the one or more internal components or the operating state of the one or more internal components further comprises a visual representation of a monitored operating parameter of the one or more internal components, the visual representation of the monitored operating parameter being displayed relative to the schematic visual representation of the one or more components.

12. The control system of claim 9, wherein the controller is configured to adjust the one or more display properties based on the variations in the received crop flow information such that the time-varying animated view provides a visual indication of the amount of crop flowing between first and second locations within the harvester.

13. The control system of claim 9, wherein the controller is configured to adjust the one or more display properties by adjusting a position or relative height of a line within the visual display that represents the amount of crop flowing within the harvester along the at least a portion of the crop flow path.

14. The control system of claim 9, wherein the controller is further configured to automatically control an operation of at least one electronically controllable component of the harvester to adjust the crop flow through the harvester based on an input received from an operator of the harvester.

15. A method for controlling a harvester, the method comprising:
receiving, with a computing device, crop flow information providing an indication of how harvested crop is flowing along a crop flow path through the harvester;
generating, with the computing device, display information for providing a visual display associated with the crop flow information, the visual display including a visual representation of crop flow within the harvester along at least a portion of the crop flow path; and
adjusting, with the computing device, one or more display properties of the visual display based on variations in the received crop flow information indicative of a change in an amount of crop flow within the harvester to provide a time-varying animated view of the crop flow along the at least a portion of the crop flow path.

16. The method of claim 15, further comprising receiving a captured image of the harvested crop at a given location within the harvester, wherein generating display information for providing the visual display comprises generating display information for displaying both the visual representation associated with time-varying animated view of the crop flow and an image-based visual representation of the harvested crop including the captured image.

17. The method of claim 15, further comprising receiving data associated with a monitored operating parameter of one or more internal components of the harvester, wherein generating display information for providing the visual display comprises generating display information for displaying both the visual representation association with time-varying animated view of the crop flow and a visual representation of the monitored operating parameter of the one or more internal components.

18. The method of claim 15, wherein adjusting the one or more display properties of the visual display comprises adjusting the one or more display properties of the visual display based on the variations in the received crop flow information such that the time-varying animated view of the crop flow provides a visual indication of the amount of crop flowing between first and second locations within the harvester.

19. The method of claim 15, wherein adjusting the one or more display properties of the visual display comprises adjusting a position or relative height of a line within the visual display that represents the amount of crop flowing along the at least a portion of the crop flow path.

20. The method of claim 15, further comprising automatically controlling an operation of at least one electronically controllable component of the harvester to adjust the crop flow through the harvester based on an input received from an operator of the harvester.

* * * * *